United States Patent
Fristedt

(10) Patent No.: US 6,914,217 B2
(45) Date of Patent: Jul. 5, 2005

(54) DEVICE AND METHOD FOR HEATING OF A SEAT

(75) Inventor: Tommy Fristedt, Bottnaryd (SE)

(73) Assignee: Kongsberg Automotive AB (SE)

( * ) Notice: Subject to any disclaimer, the term of this patent is extended or adjusted under 35 U.S.C. 154(b) by 80 days.

(21) Appl. No.: 10/332,324

(22) PCT Filed: Jul. 2, 2001

(86) PCT No.: PCT/SE01/01520
§ 371 (c)(1),
(2), (4) Date: Jan. 7, 2003

(87) PCT Pub. No.: WO02/06913
PCT Pub. Date: Jan. 24, 2002

(65) Prior Publication Data
US 2004/0011778 A1 Jan. 22, 2004

(30) Foreign Application Priority Data
Jul. 19, 2000 (SE) .............................................. 0026898

(51) Int. Cl.[7] .................................................. H05B 1/00
(52) U.S. Cl. ...................... 219/217; 219/494; 219/528; 219/529; 219/549; 219/202; 219/530; 219/540; 297/180.12; 374/208
(58) Field of Search .............................. 219/217, 494, 219/528–529, 549, 202, 530, 540; 297/180.12; 374/208

(56) References Cited

U.S. PATENT DOCUMENTS

| | | | |
|---|---|---|---|
| 4,058,255 A | 11/1977 | Linder et al. | |
| 4,189,093 A | 2/1980 | Schnaibel et al. | |
| 4,198,562 A | * 4/1980 | Mills et al. | 219/505 |
| 4,827,103 A | 5/1989 | Asp | |
| 6,541,737 B1 | * 4/2003 | Eksin et al. | 219/217 |

FOREIGN PATENT DOCUMENTS

GB 2343747 A1 5/2000

\* cited by examiner

Primary Examiner—Shawntina Fuqua
(74) Attorney, Agent, or Firm—Lerner, David, Littenberg, Krumholz & Mentlik, LLP

(57) ABSTRACT

The invention is a device for heating a seat (3) comprising a heating element (2) connected to a control unit (1) which is arranged to feed a current (I) through the heating element (2), a detector unit (6) in connection to the heating element (2) connected to the control unit (1) with current (I) being fed when the measured temperature value falls below a predetermined desired value ($T_B$). The invention is characterized in that the detector unit (6) comprises at least one first temperature sensor (7) on or in the vicinity of the heating element (2) with at least one further temperature sensor (8) at a predetermined distance from the heating element (2). By means of the invention a more even heating of the seat is obtained with an increased comfort for a person sitting in the seat.

12 Claims, 3 Drawing Sheets

DEVICE AND METHOD FOR HEATING OF A SEAT

TECHNICAL FIELD

The present invention refers to a device for heating of a seat, comprising a heating element connected to a control unit which is arranged to feed a current through the heating element, a detector unit in connection to the heating element connected to the control unit, with current being fed when a measured temperature value falls below a predetermined desired value.

The invention also relates to a method for heating a seat, comprising a heating element connected to a control unit which is arranged to feed a current through the heating element, which method comprises detecting the current temperature in connection to the heating element and controlling the temperature by feeding said current through the heating element if said current temperature falls below a predetermined desired temperature.

The invention can in particular be applied in connection with heating of electrically heatable seats for those travelling in a vehicle.

STATE OF THE ART

Electrically heatable seats are used in contemporary vehicles for reasons of comfort and safety. Both the driver's seat and the other seats in the vehicle can be arranged so that they can be heated by means of special heating elements in the shape of electrically conducting wires, which are arranged in the shape of a heating coil in the seats. Such a heating coil is normally placed in the cushion and in the backrest of the seats on production. In addition, the heating element is connected to a current feeding unit which delivers current. In this way, the heating element can be heated to a suitable temperature.

A problem with previously known heating elements arises from a desire to have a carefully adjusted temperature on the surface of each seat, i.e. on the surface which a person travelling in the vehicle will feel. To this end, the temperature of the heating element can be controlled by means of a temperature sensor which is arranged in close connection to the heating element and which is connected to a central control unit. By means of the temperature sensor and the control unit, the ambient temperature can be detected. The control unit also comprises current feeding circuits which, for example, can be based on transistor or relay technology, for feeding current to the heating element. In this way, the central heating element is arranged to feed a certain current through the heating element until a certain desired value of the temperature is obtained. The setting of this desired value can, for example, be carried out by means of fixed resistances or by means of an adjustable potentiometer which is controlled by those travelling in the vehicle.

By means of the above described control method, current can be delivered to the heating element until the central control unit indicates that the desired value has been reached. When this is the case, the current feed is interrupted. This causes the heating element to successively be cooled. When the heating element has cooled so much that its temperature again falls below the desired value, the current feeding to the heating element will be resumed. In this manner, the temperature control will continue as long as the system is active.

Although this previously known system normally provides a reliable heating and temperature control for a vehicle seat, it does, however, have certain drawbacks. Such a drawback arises from the fact that previous systems with a temperature sensor being arranged in dose connection to or on the heating element give a relatively quick heating of the sensor, which leads to the temperature control being started before the surface temperature of the seat has reached the desired value. In addition, relatively quick temperature shifts of the sensor are obtained during the temperature control. As a whole, this results in the seat being heated relatively slowly, i.e. the seat is given a temperature which relatively slowly approaches the desired value. This can be perceived by the user as a too slow heating of the seat. In order to compensate this, a higher desired value of the temperature in the seat is often set. When the control is active during a longer period, the temperature in the seat approaches the too highly set desired temperature, which results in a too high temperature in the seat when it is used for a longer period of time.

In attempts to compensate for the above described problem, the temperature sensor has been arranged at a distance from the heating element, which results in the temperature control being started after the surface temperature of the seat has reached the desired value. This causes a temperature control of lower quality or no temperature control at all, and also causes too high a temperature in the seat. Taken together, this can be perceived as a too rapid heating with too large temperature variations by somebody sitting in the seat. Placing the temperature sensor far from the heating element also reduces the possibility of discovering any possible short circuits in the heating element which can result in for example too high a temperature on the surface of the seat.

In attempts to solve the said problems, there has traditionally been a need for compromising when arranging the temperature sensor, with the result that all of the said problems occur, although they are not as obvious as in the said extreme cases.

SUMMARY OF THE INVENTION

A primary purpose of the present invention is thus to provide improved heating of a vehicle seat, in which the above described disadvantages are eliminated, and which gives a surface temperature which during the control will be more pleasant for a person sitting in the seat.

This purpose is obtained by means of a device of the initially mentioned kind, which is characterized in that the detector unit comprises at least a first temperature sensor on or in the vicinity of the heating element, with at least one more temperature sensor at a predetermined distance from the heating element.

The above purpose is also obtained by means of a method of the initially mentioned kind, which is characterized in that it comprises detecting a temperature in the vicinity of the heating element and detecting additionally one temperature at a predetermined distance from the heating element, which temperatures together give a value regarding the current temperature to be compared with a desired temperature in connection with said control.

The basic idea of the invention is that a temperature on or in the vicinity of the heating element and a temperature sensor at a predetermined distance from the heating element together will provide improved control qualifies with smaller temperature swings and a surface temperature dose to the desired temperature. This in turn will lead to improved comfort for somebody sitting in the seat.

Preferred embodiments will become apparent from the following dependent patent claims.

BRIEF DESCRIPTION OF THE DRAWINGS

The invention will in the following be described in connection to an example of a preferred embodiment and the appended drawings in which.

PREFERRED EMBODIMENT

Figure 1:
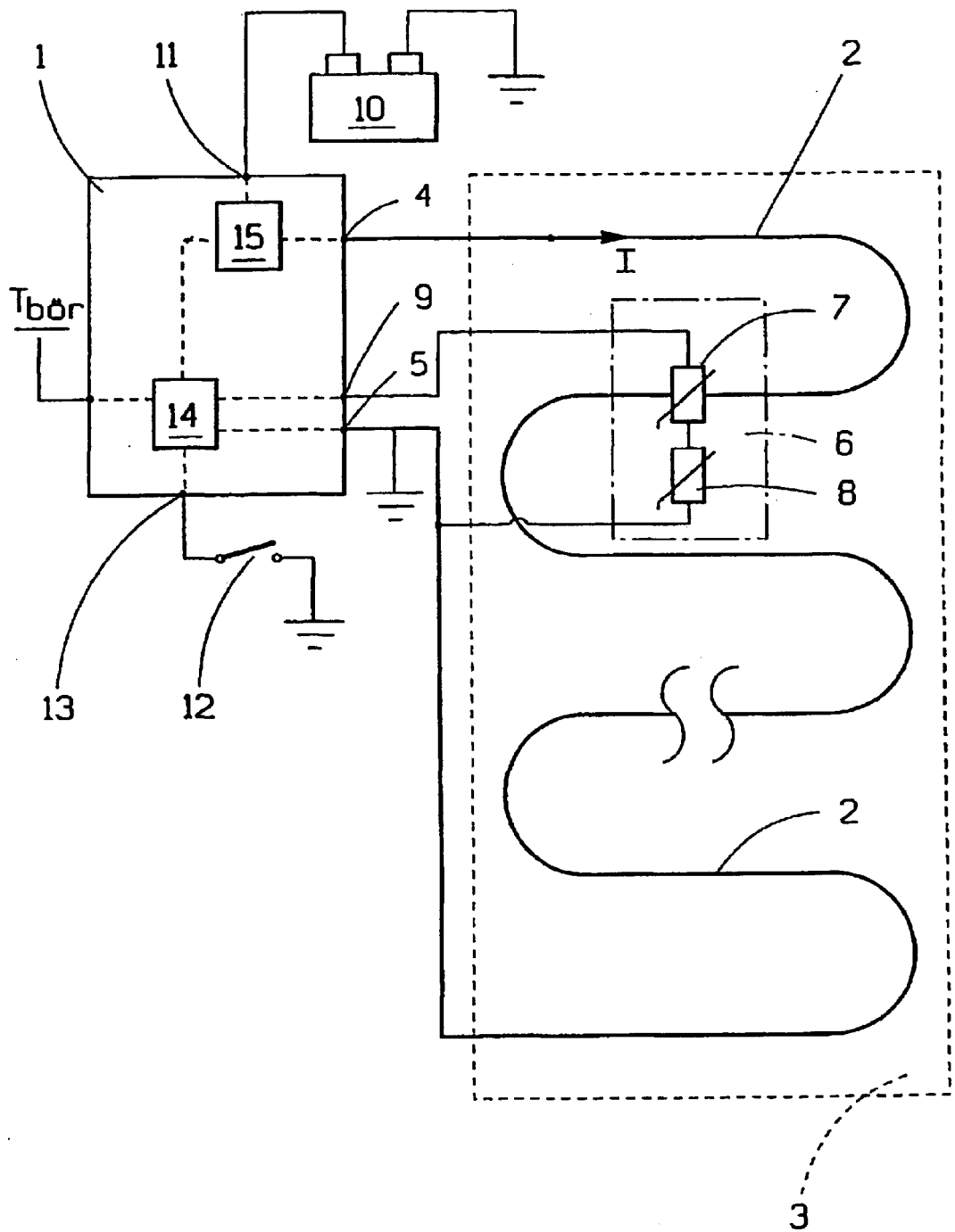
FIG. 1 is a principal circuit scheme which shows a device according to the present invention.

FIG. 1 shows a principal circuit scheme of a device according to the present invention. According to the preferred embodiment, the invention is intended to be used in connection with electrically heatable seats in vehicles. A control unit 1 is shown in principle in the figure, the internal components and connections of which are shown by means of dashed lines. In the figure, all of the components of the control unit 1 are not shown but only those parts which are necessary for the understanding of the invention.

The control unit 1 is arranged to feed a certain current I through a heating element 2. This heating element 2 is, as such, of a known kind and consists of an electrical conductor, which by means of its electrical resistance forms a heating coil. The heating element 2 is arranged inside a vehicle seat, preferably in its cushion part 3, and consists of heating wires, preferably in a pattern (see FIG. 1) which is intended to cover the main part of the surface of the cushion part 3. In principle, the heating element 2 can also be arranged in the back rest of the seat. Although FIG. 1 only shows one heating element 2, it is possible to connect several such elements to the control unit 1, for example in the shape of a separate heating element for the cushion of the seat 3 and a heating element for the back rest of the seat. In the case where more than one heating element is used, these can be connected to the control unit either in parallel or in series.

As shown in FIG. 1, the heating element 2 is connected to the control unit 1 via two connections 4 and 5 respectively, of which said connection 5 also is connected to ground via for example a connection in the body of the vehicle.

In connection to the heating element 2, there is arranged a detector unit 6 which in turn comprises a first temperature sensor 7 and a second temperature sensor 8 which suitably are electrically connected to the control unit 1 via the above-mentioned connection 5 and a further connection 9. The temperature sensors 7, 8 preferably consist of thermistors of the NTC type ("Negative Temperature Coefficient") which exhibit a temperature dependent resistance $R_1$ and $R_2$ which corresponds to the temperature T1 and T2 respectively, which through the positioning of the sensors 7, 8 are detected in connection to the heating element 2 and at a predetermined distance from the heating element 2 respectively. The first temperature sensor 7 can be arranged directly on the heating element 2 or essentially adjacent to the heating element 2. The second temperature sensor 8 is arranged at a predetermined distance from the heating element 2, for example between two of the essentially parallel lines which are defined by the S-shaped pattern in which the heating element 2 is positioned, or, depending on the shape of the seat 3, in another position distant from the heating element 2 for example adjacent to the cushion surface. Normally, the second temperature sensor 8 then has a slightly lower temperature than the first temperature sensor 7, since the second sensor 8 is arranged farther from the heating element 2 than the first sensor 7.

The detector unit 6 consists of the temperature sensors 7, 8 which are arranged together on the same flex board, i.e. a film-like supporting substrate shown in the figure by means of a rectangle with dashed lines. The flex board comprises a plurality of holes (not shown) which permit alternative positioning of the temperature sensors. The temperature sensors 7, 8 are preferably coupled electrically in series, and connected to the control unit 1 via leads coupled to the connections 4, 9. According to an alterative solution, however, each of the temperature sensors can be individually connected to the control unit. In the latter case, there is a need for double inputs and measuring bridges in the control unit. The detection by means of the temperature sensors 7 and 8 will be described in detail below.

In addition there is a current source 10 connected to the control unit 1 via a further connection 11. The current source 10 is preferably the starting battery of the vehicle. The system additionally comprises an on/off switch 12, which is preferably integrated in the ignition lock of the vehicle (not shown). The switch 12 is connected to an additional connection 13 of the control unit 1. The control unit 1 is arranged so that it can be activated, and thus afford heating of the heating element 2 when the switch 12 is closed.

The control unit 1 comprises a logic part 14, which is preferably computer based, but which can also consist of known electronic circuits. The logic part 14 is connected to the above-mentioned connections 5, 9 and 13 and is arranged to detect a temperature value T which corresponds to a composite value of the detected current temperature T1 and T2 of the temperature sensors 7 and 8 respectively.

With renewed reference to FIG. 1, it can be seen that the control unit 1 comprises a switch unit 15 which depending on signals from the logic part 14 feeds current I to the heating element 2.

The logic part 14 is thus arranged to obtain values of the local temperature T1 and T2 of the temperature sensors 7 and 8 respectively, which corresponds to a resistance value of the respective temperature sensor, and which together gives a combined resistance value which consists of the sum of the resistances of the two temperature sensors which gives a total resistance value which corresponds to the current temperature T. If the current temperature T falls below a predetermined desired value $T_B$, which in turn corresponds to a certain desired temperature $T_S$ on the surface of the vehicle seat 3, the logic part 14 will control the switch unit 15 to deliver current I to the heating element 2. When the desired value is reached the logic part 14 will cut off the current feeding via the switch unit 15 to the heating element 2.

Figure 2:
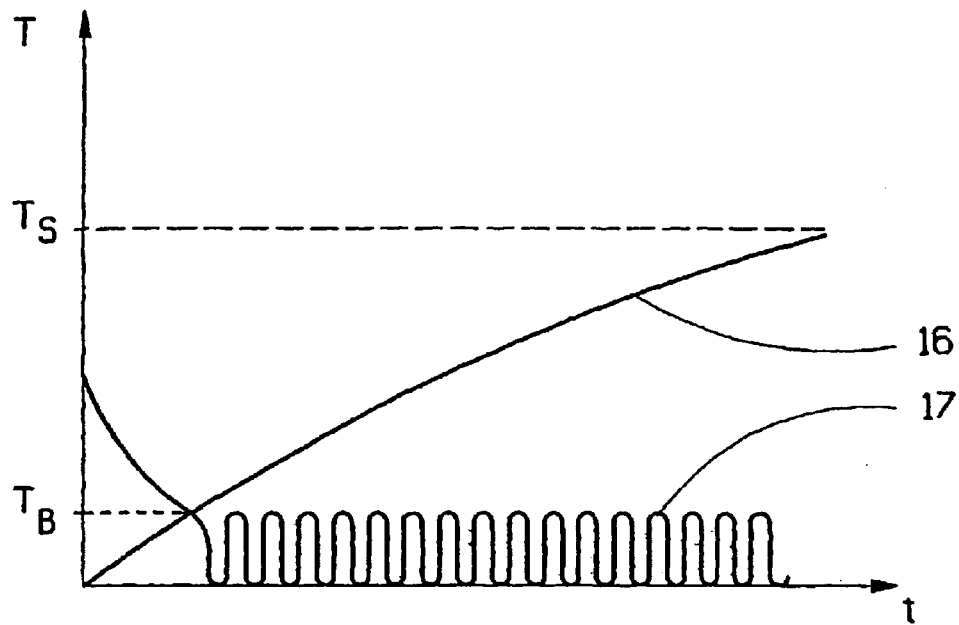
FIG. 2 shows a control process according to prior art in more detail in the case of only one temperature sensor being utilized placed close to a heating element.

FIG. 2 shows a diagram which indicates the connection between the temperature T and time. In the diagram, there is shown a first solid line 16 which in principle shows the process of a temperature control according to prior art, in more detail a temperature control which uses one single temperature sensor which is arranged in close connection to (or even directly on) a heating element. The solid line 16 then shows how the temperature on the surface of the seat successively increases from a low value and up to a certain set value $T_S$. Furthermore, the system is arranged to heat the vehicle seat with a predetermined desired temperature value $T_B$ which is compared to the temperature that corresponds to the signal from single temperature sensor. This desired value $T_B$ can in advance be set to a value which corresponds to the desired temperature $T_S$ on the surface of the seat, which can be for example 35° C., and corresponds to the temperature on the surface of a "normal seat", i.e. a kind of seat which has been defined in advance with a certain given design, upholstery etc. or a value which is decided by the user depending on his wishes.

It is previously known that systems with a single temperature sensor which is arranged in dose connection to or on the heating element will give a relatively quick heating of the sensor, so the temperature control starts before the surface temperature of the seat has reached the desired value. In addition, relatively quick temperature shifts of the sensor are obtained during the temperature control. On a whole, this results in the seat being heated relatively slowly, i.e. the seat is given a temperature which relatively slowly approaches the desired value. This process is indicated in FIG. 2 by means of a second solid line 17, which shows the supplied heat effect to the heating element, which in turn is an indication of how the temperature of the heating element varies depending on the switched on or off current feed through the heating element. Thus, the desired value $T_B$ regarding the temperature at which the current feed through the heating element is first switched off will be obtained relatively quickly, following which relatively quick on and off switching of the current through the heating element is carried out. Altogether, this results in the seat being heated relatively slowly, i.e. it gets a temperature which relatively slowly approaches the desired temperature $T_S$. The user can perceive this as a too slow heating of the seat.

Figure 3:
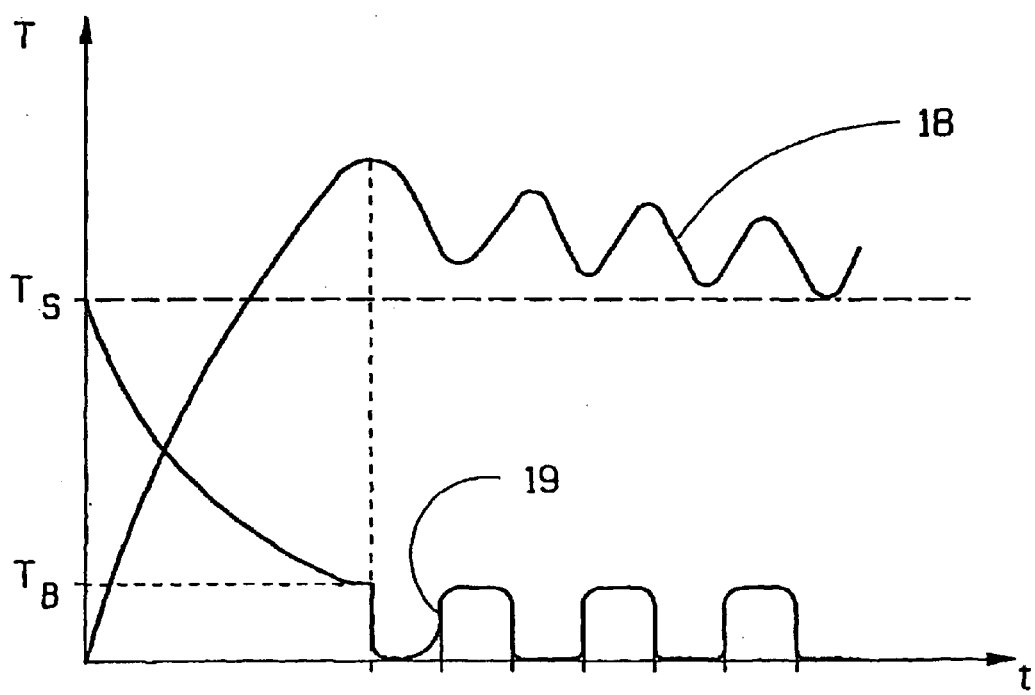
FIG. 3 shows a control process according to prior art in the case of only one temperature sensor arranged at a relatively long distance from a heating element being utilized.

It is also previously known that arranging one single temperature sensor at a long distance from the heating element will result in the opposite of what has been described above, with a temperature control that starts after the surface temperature of the seat has reached the desired value. This will result in a lower quality temperature control, or no control at all, and also in a too high temperature in the seat. Altogether, this can be perceived as a too powerful and high heating with too large temperature variations for the person sitting in the seat. The process is shown in FIG. 3, which similarly to FIG. 2 shows the connection between the temperature T of the seat in question and time. In the figure, there is shown with an additional solid line 18 a control process in which this single temperature sensor is used, which then is placed relatively far from the heating element. There is also shown with another solid line 19 how heat effect is fed through the heating element as a consequence of the said current feeding. From the figure, it can be seen that heating power is fed to the heating element during a relatively long time until a first switch-on takes place (i.e. at a state which corresponds to a certain desired temperature value $T_B$ of the heating element). This means that the surface of the seat will be heated to a temperature which exceeds the desired value $T_S$, which can be perceived by the user as a too powerful heating of the seat.

With the above described traditional single temperature sensor, the positioning of the sensor must be a compromise between the two cases described above, which means that you either get a system with a relatively rapid temperature control and a too slow heating of the seat, or a system with a relatively slow temperature control and a process with overshoot and a too powerful heating of the seat as a consequence.

Due to the above-mentioned problems of prior art, regarding for example too large temperature variations when positioning a single temperature sensor in close connection to a heating element, there is according to the invention a measurement of the temperature in the vicinity of the heating element 2 and a further measurement at a predetermined distance farther away from the heating element 2. This principle will now be explained with reference to FIG. 4, which shows the connection between the temperature T of the surface of the seat and time. The figure also indicates a desired value $T_S$ regarding the temperature of the seat, which is decided by the user and a corresponding desired value $T_B$ for a composite temperature of the two temperature sensors 7, 8 (see FIG. 1).

Since the invention comprises a detector unit with two temperature sensors 7, 8, a combined detected value is obtained, which consists of the sum of the resistances in question of the two temperature sensors. This total value then corresponds to a combined temperature value which during the heating of the seat is compared to a desired value $T_B$ which in turn corresponds to the desired temperature $T_S$ on the surface of the seat. If the detected temperature exceeds the desired value $T_B$, the current feeding through the heating element will cease in analogy to what has been described above. The combined resistance value of the temperature sensors 7, 8 will consist of two components, a first component which is affected by the relatively quick temperature changes of the temperature sensor 7 which is arranged in close vicinity to the heating element 2, and a second component which is influenced by the relatively slow temperature changes of the temperature sensor 8 which is positioned relatively far from the heating element 2. Together, this gives a temperature control which corresponds to a balancing between the two mentioned known methods. Through proper tuning of the positions of the temperature sensors 7, 8 according to the invention, there is then obtained an optimally adjusted heating of the seat, and the desired temperature on the surface of the seat can be reached relatively quickly, however without the excessive temperature variations which follow the positioning of a single temperature sensor relatively far from the heating element. The too slow heating of the seat which is a result of positioning a single temperature sensor relatively close to the heating element is not obtained either.

The control device according to the invention in this way will become more robust with regard to temperature variations, and will maintain its speed. A further advantage of the invention is that a combination of a quick and of a slow control process will result in a more "natural" perception by the person in the seat and in a raised level of comfort.

Figure 4:
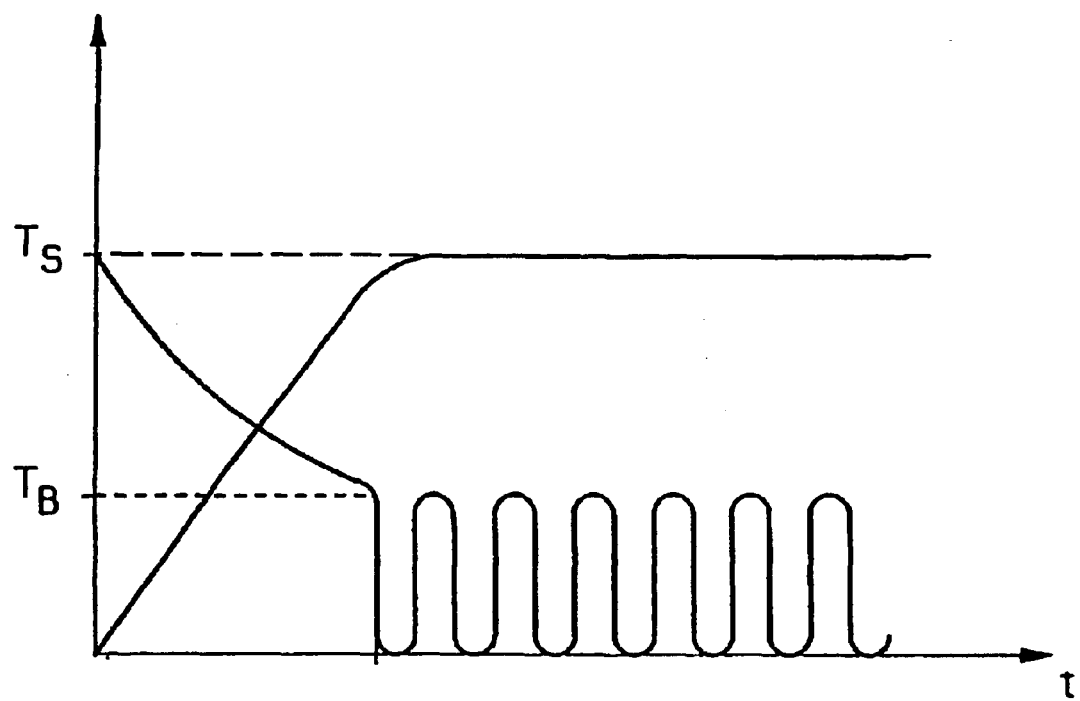
FIG. 4 shows a control process according to the invention.

When the system is switched on and the temperature control is to, start the logic part 14 (see FIG. 1) will control the switching unit 15 so that the current I is fed to the heating element 2. It is here assumed that the heating element 2 has a certain initial temperature when the heating starts. Since the current I flows through the heating element 2, its temperature will successively increase. The control of the temperature of the heating element 2 will then be carried out depending on whether a desired value $T_B$ is reached. The present invention combines the two positions described above, with the two temperature sensors 7 and 8 giving a combined resistance value which corresponds to the current temperature T. The first temperature sensor 7 is positioned on or in the vicinity of the heating element 2, and the second temperature sensor 8 is positioned at a predetermined distance from the heating element 2 as has been described above. The temperature sensors 7, 8 are preferably thermistors of the NTC type, i.e. "Negative Temperature Coefficient" which means that the resistance of the thermistors decreases with increasing temperature. The two NTC temperature sensors 7, 8 are connected either in series as shown in FIG. 1, or in parallel depending on the desired control. As an alterative, the thermistors can also be of the PTC type, i.e. "Positive Temperature Coefficient" which means that the resistance of the thermistors increases with increasing temperature. If the temperature sensors 7, 8 are of the PTC type they are either connected in series or in parallel, depending on the desired control. The temperature sensors 7, 8 are fed with current from the control unit 1, with the connected temperature sensors detecting the local temperatures T1 and T2 and giving the control unit 1 a combined value which reflects a current temperature T, which is a combined resistance value which corresponds to the two temperatures and which is within the interval T1 to T2. The current temperature T in a better manner reflects the ambient temperature which is to approach the desired temperature value. By means of said arrangement, a reduction of the quick process given by the "warm" first temperature sensor 7 is obtained, as is also an increase of the slow process given by the "cold" second temperature sensor 8, which results in a process which is somewhere in between the two earlier described and which is illustrated in FIG. 4. The process will depend on, among other things, the position of the temperature sensors 7, 8 but will, regardless of this, give a better control of the surface temperature in a seat than known devices, which can be seen as advantageous and comfortable by the person in the seat. An additional advantage of the invention is that the control does not become as sensitive to the position of the sensor as previously known devices, which leads to increased position tolerances.

In conclusion, the invention is suitably utilized so that the temperature sensor which is the coldest will control the process. This can be utilized so that when starting to heat the seat, the second temperature sensor 8 is the coldest until it reaches the desired value $T_B$, at which point in time the heating element 2 is switched off, which means that the first temperature sensor 7 will cool off and will become the colder of the two temperature sensors 7, 8 and then it will be the first temperature sensor 7 which controls the control process. In this way, the best properties of the two positions are combined, which leads to a better control with a more stabile temperature around the desired value.

The temperature sensors 7, 8 can have the same resistance and desired value or different resistances and the same desired value, or the same resistances but different desired values, depending on desires for specific properties.

The temperature sensors 7, 8 can have the same thermic mass or different thermic mass depending on requests for specific properties.

According to a further embodiment of the invention, a connection (not shown) is placed between the temperature sensors 7, 8, i.e. an electrical connection which is coupled to the connection which connects the two sensors. The connection will be connected to the control unit 1, and used to provide information regarding the temperature sensors 7, 8. Such information can, for example, be used for diagnosing, or as a measurement sensor for an algorithm for better control instead of, for example, the average value of the two resistances.

The invention is not limited to that which has been described above, different embodiments are possible within the scope of the patent claims. For example, the invention can in principle be used for heating other seats than vehicle seats. Furthermore, various types of temperature sensors can be used, for example thermistors with negative or positive temperature coefficient. The temperature sensors 7, 8 do not need to be arranged on a common flex board, but can be arranged as multiple separate sensors.

A temperature sensor in the vehicle, for example for a climate control system, can also in principle be used in combination with the invention.

Furthermore, the positioning of the temperature sensors can be different depending on the type of device which is to be heated and its material. For example, the "cold" sensor can be arranged on the surface of a seat 3 if the seat is thick or between the threads of the heating element 2 if the seat is thin.

The flex board with the two temperature sensors 7, 8 can be arranged in an arbitrary position for an arbitrary function. The flex board is not limited to two sensors either but can comprise an arbitrary amount.

The invention is not limited to heating either but can also be used when cooling or ventilating the seat in question.

What is claimed is:

1. A device for heating a seat comprising:
   a heating element;
   a control unit adapted to feed a current through said heating element; and
   a detector unit including at least a first temperature sensor juxtaposed with said heating element within a first predetermined distance from said heating element, and at least one additional temperature sensor disposed a second predetermined distance from said heating element, said second predetermined distance being greater than said first predetermined distance,
   whereby said first temperature sensor and said at least one additional temperature sensor are connected so that they provide a combined temperature value which is fed to said control unit, said current being fed through said heating element when said combined temperature value falls below a predetermined desired temperature value.

2. The device according to claim 1, wherein said first temperature sensor and said at least one additional temperature sensor are coupled in series.

3. The device according to claim 1, wherein said first temperature sensor and said at least one additional temperature sensor are coupled in parallel.

4. The device according to claim 1, wherein said first temperature sensor and said at least one additional temperature sensor are of the NTC type.

5. The device according to claim 1, wherein said first temperature sensor and said at least one additional temperature sensor are of the PTC type.

6. The device according to claim 1, wherein said first temperature sensor and said at least one additional temperature sensor have the same resistance and are working towards the same desired value.

7. The device according to claim 1, wherein said first temperature sensor and said at least one additional temperature sensor have different resistances and are working towards the same desired value.

8. The device according to claim 1, wherein said first temperature sensor and said at least one additional temperature sensor have the same resistance and are working towards different desired values.

9. The device according to claim 1, wherein said first temperature sensor and said at least one additional temperature sensor have essentially the same thermic mass.

10. The device according to claim 1, wherein said first temperature sensor and said at least one additional temperature sensor have different thermic masses.

11. The device according to claim 1, whereby a connection between said first temperature sensor and said at least one additional temperature sensor to provide information to said control unit.

12. A method for heating a seat comprising:

providing a seat including a heating element connected to a control unit which is arranged to feed a current through said heating element;

detecting a first temperature by means of a first sensor disposed adjacent to said heating element within first predetermined distance of said heating element, and detecting a second temperature by means of a second sensor disposed a second predetermined distance from said heating element, said second predetermined distance being greater then said first predetermined distance, said first and second temperature sensors being connected so that they provide a common combined signal which defines a combined temperature value in the interval between said first and second temperatures depending on the positions of said temperature sensors; and, controlling said combined temperature by feeding said current through said heating element when said combined temperature falls below a predetermined desired temperature.

* * * * *

UNITED STATES PATENT AND TRADEMARK OFFICE
CERTIFICATE OF CORRECTION

PATENT NO. : 6,914,217 B2
APPLICATION NO. : 10/332324
DATED : July 5, 2005
INVENTOR(S) : Tommy Fristedt Page 1 of 1

It is certified that error appears in the above-identified patent and that said Letters Patent is hereby corrected as shown below:

Column 2, line 3, "dose" should read --close--.
Column 2, line 63, "dose" should read --close--.
Column 5, line 11, "dose" should read --close--.

Signed and Sealed this

Fifteenth Day of January, 2008

JON W. DUDAS
*Director of the United States Patent and Trademark Office*